Patented Nov. 7, 1939

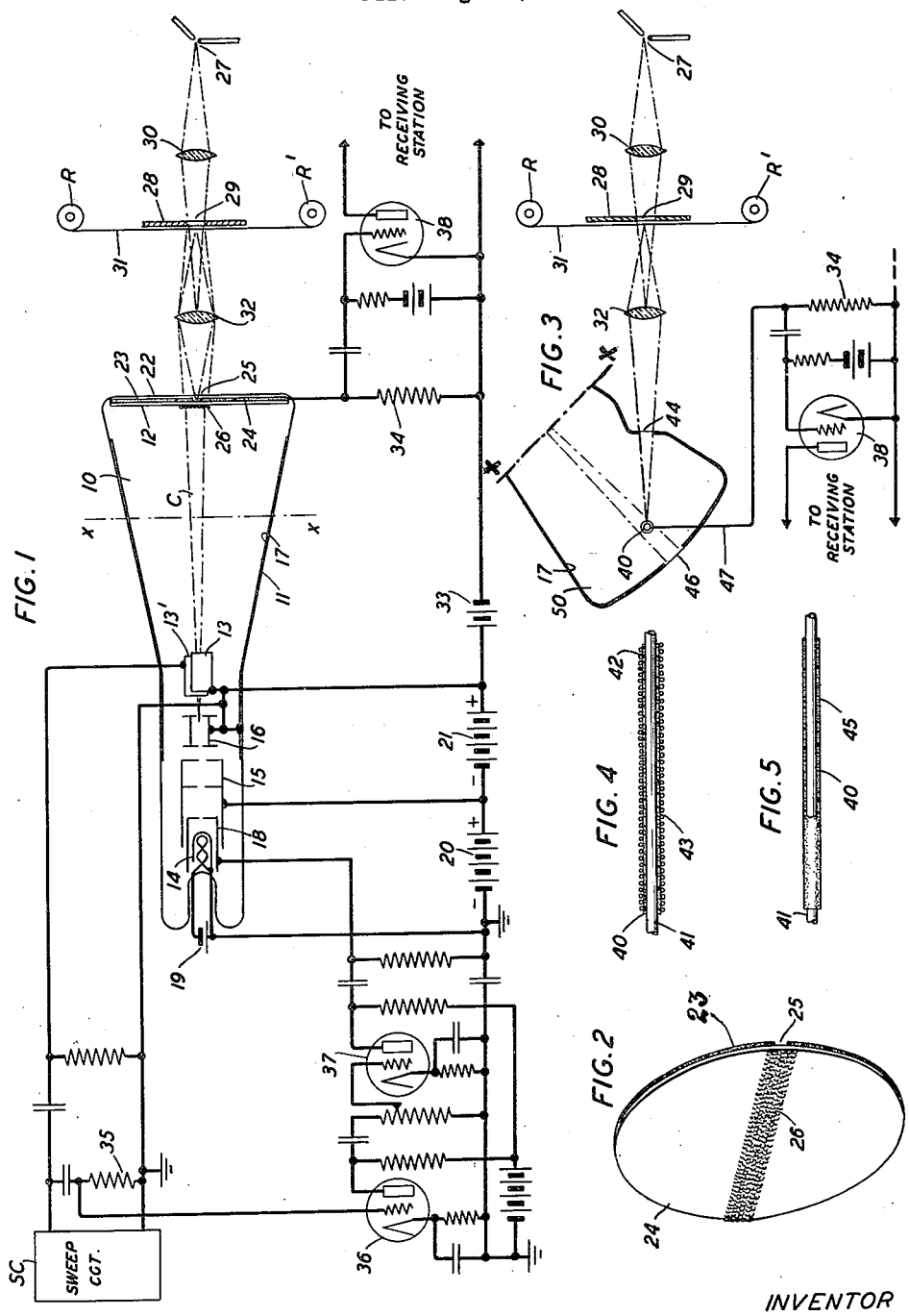

2,179,243

UNITED STATES PATENT OFFICE 2,179,243

CATHODE RAY DEVICE

Herbert E. Ives, Montclair, N. J., assignor to Bell Telephone Laboratories, Incorporated, New York, N. Y., a corporation of New York Application August 21, 1936, Serial No. 97,131

15 Claims. (Cl. 178—7.2)

This invention relates to electro-optical devices and more specifically to cathode ray tube devices employing light sensitive screen structures for use particularly in television.

It is an object of this invention to provide a novel arrangement for producing image currents using cathode ray devices.

In accordance with this invention a cathode ray image transmitting system has been provided in which scanning with the cathode beam is accomplished in a single dimension only. The transverse component of the scanning movement is provided by some other means such as, for example, a continuously moving film. An image of a portion of the film is projected upon an elongated target in a cathode ray tube, which target is also scanned by the cathode ray beam generated within the tube. A mirror drum arrangement or any other means may be used, if desired, to provide the transverse component of the scanning movement.

In a preferred embodiment of this invention, the cathode ray device employed comprises a gas-tight container within which is an electron gun for generating a beam of electrons, a single set of deflecting plates for causing the beam to move in a linear path, and an elongated strip of photo-emissive globules mounted on a glass or mica disc having a metallic backing. The metallic backing has an elongated slit cut therein adjacent the strip of photo-emissive globules. A projection lens system is provided to project an image of a portion of a continuously moving motion picture upon the slit and adjacent portions of the metallic coating of the disc. The slit defines the size of the elemental line of light transmitted to the photo-sensitive globules. These globules emit electrons and become charged to values respectively proportional to the tone values of the corresponding elemental areas of the object on the moving picture film. The beam focussing apparatus is preferably so constituted that a beam of rectangular cross-section having its longer dimension in a direction transverse to the elongated direction of the strip is formed. This beam is caused to scan the photo-emissive material along a linear path thereof adjacent the slit and to return along the same path. This scanning is at such a rate that an entire frame is scanned within a time interval within the period of persistence of vision. Means are provided for cutting off the electron beam during the return stroke of the beam. Inasmuch as the beam is much wider than the photo-sensitive strip, the beam control means need not be as accurately designed as would otherwise be necessary. Another advantage is that the center portion of the beam (which usually contains a more even distribution of electrons) may be used to discharge the sensitized strip. A further advantage of this arrangement is that means other than the electron beam is used to define the size of the elemental line. This may permit less stringent focussing requirements. These structural advantages together with the requirement of one sweep circuit only make the cathode ray tube of this invention a simple and inexpensive and yet accurate device.

In a modified arrangement, the elongated screen comprises a thin layer of photo-emissive material in globular form coated on and supported by a strand of taut insulated wire stretched across the path of the wedge-shaped beam which is adapted to scan it in one dimension as in the preceding arrangement. An image of a section of the motion picture film is projected into the cathode ray tube and the diameter of the photo-emissive wire defines the size of an elemental line.

As a further modification, the linear screen may comprise a wire coated with a thin layer of photo-conducting material. The apparatus is otherwise similar to that of the preceding embodiment. The last two embodiments possess the advantage that the metal filament or wire serves not only as a support for the light sensitive material but also, in the manufacturing process, serves as a conductor of sufficiently high resistance to apply heat for the baking operation.

The invention will be more readily understood by referring to the following description taken in connection with the accompanying drawing forming a part thereof, in which:

Fig. 1 is a diagram of a television transmission system embodying this invention;

Fig. 2 is a perspective view of the target or screen used in the device of Fig. 1;

Fig. 3 shows a modification of the device shown in Fig. 1;

Fig. 4 is an enlarged view of the photo-sensitive target shown in Fig. 3; and

Fig. 5 shows a modification of the target shown in Fig. 4.

Referring more particularly to the drawing, Fig. 1 shows, by way of example, a television transmitter employing a cathode ray device 10 and its associated apparatus and circuits. The device 10 comprises a gas-tight container 11 enclosing appropriate means such as an electron gun for producing a moving beam of electrons and for accelerating this beam toward a screen 12 at the end of the tube remote from the electron gun, and means such as a pair of deflecting plates 13, 13' for deflecting the beam along a predetermined path on the screen 12.

The electron-gun assembly comprises a cathode 14 and an anode 15 for producing and focussing a beam of moving electrons C and a second anode 16 for accelerating this beam toward and further focussing the beam upon the screen 12. The focussing means is preferably constituted so that the beam C is of rectangular cross-section, the larger dimension being transverse to the direction of scanning. This shape of beam may be produced by making the aperture in anode 16 of rectangular cross-section. If desired, a focussing arrangement for producing a rectangular shaped spot such as is disclosed in British Patent 417,713 to Kurt Schlesinger may be used. A conducting coating 17 of any suitable material, such as aquadag, is placed inside of the tube and extends along the surface of the tube from the second or accelerating anode 16 almost up to the screen 12. This conducting coating 17 is electrically connected to the accelerating anode 16. Between the cathode 14 and the anode 15 is positioned a modulating grid 18, the purpose of which will be described more fully below. A battery 19 supplies current to heat the cathode 14, a battery 20 places the anode 15 at a positive potential with respect to the cathode 14, and a battery 21 places the anode 16 at a higher positive potential than that of the anode 15. A sweep circuit SC, which may be of any well-known form, is connected by a suitable resistance and capacity coupling to the sweep plates 13 and 13'. Sweep plate 13 may be connected inside the tube to the accelerating anode 16.

The screen structure 12 in this embodiment preferably comprises a layer of opaque metallic material 23 which is coated inside the end wall 22 of the cathode ray device 10, and a mica or glass plate 24 cemented on the inside of the opaque layer 23. A transparent horizontal slit 25 is ruled in the layer of opaque material 23. On the inside of the mica or glass plate 24 and opposite the slit 25 is a narrow strip 26 of any suitable photo-sensitive material, such as, for example, oxidized silver globules sensitized with caesium. The photo-sensitive layer is preferably very thin. The construction of the screen structure 12 may be more readily observed by referring to the enlarged perspective view shown in Fig. 2. In this figure the photo-sensitive strip 26 has been indicated as being much wider than the slit 25 but in a preferred arrangement the strip 26 will be little, if any, wider than the slit 25.

Associated with the screen 12 and located outside of the cathode ray tube is an optical system comprising a point source of light 27, the light from which is focussed upon an aperture 29 in a mask or plate 28 by means of a suitable lens 30. The mask 28 is located behind a continuously moving film 31 which passes over rollers R and R'. The image of a portion of the film 31 is focussed by any suitable means, such as for example, lens 32, upon the transparent slit 25 and adjacent portions of the opaque metallic coating 23. The slit 25 allows an elemental line of the projected portion of the film 31 to pass through the mica or glass disc 24 to thereby illuminate an elongated strip of the photo-emissive target 26. There is thus projected upon the photo-sensitive strip 26 a single line of the image of the object on the film 31. The illuminated strip 26 of photo-emissive material is caused to emit electrons and thereby charge up the photo-emissive globules in accordance with the light-tone values of the corresponding elemental areas of the object 31. This emission of electrons sets up a series of electrostatic charges between the globules 26 and the conducting material 23 on the opposite side of the dielectric member 24. The cathode ray beam C, which is, as explained above, preferably of rectangular cross-section, is caused to scan the elemental line of electrostatic charges by means of the varying sweep voltage applied between the deflecting plates 13 and 13'. The cathode ray beam C thus discharges or brings to equilibrium these elemental charges and these surges pass through the resistance 34 in the external circuit. A battery 33 has been shown connected between the aquadag layer 17 and the opaque conducting material 24 through the resistance 34 but the system is operative without the battery 33. These surges, taken in succession, constitute an image current. After amplification by the device 38 which may be, if desired, multi-stage, the image current may be used to modulate a carrier wave for transmission over a suitable wire or radio channel or channels to a receiving station.

Also associated with the cathode ray device 10 is a circuit for extinguishing or suppressing the cathode ray beam on its return stroke so that the elemental electrostatic charges caused by the emission of the electrons from the photo-sensitive globules 26 will not be discharged. On the discharge stroke of the sweep circuit SC, the flow of current through the resistance 35 is amplified by tubes 36 and 37 and this amplified pulse applied between the cathode 14 and the modulating grid 18 to block off the electron beam during this discharge or flyback stroke. No attempt is made in this case to claim this suppressing arrangement per se and any other suitable arrangement for blocking off the beam during its return sweep may be used as well. If the return sweep is fast enough, the beam suppression means may prove unnecessary.

The modification shown in Fig. 3 differs from that of Fig. 1 principally in the type of linear photo-sensitive screen used. For a clearer understanding of this photo-sensitive element shown in Fig. 3, reference will now be made to Fig. 4, which is an enlarged view of the photo-sensitive device of Fig. 3. The linear screen 40 preferably comprises a conducting wire 41 coated with a thin layer 42 of insulated or dielectric material, such as glass, quartz or other suitable material having approximately the same coefficient of expansion as the wire 41, on which a discontinuous layer 43 of photo-emissive globules is deposited. The globules may comprise silver globules which have been oxidized, baked and then sensitized with caesium. This linear element 40 is mounted within and near one end of the cathode ray device 50 and performs the same function as the screen 12 in Fig. 1. It is connected by a lead 45 to the resistance 34. The optical system for projecting an image of a portion of the film 31 upon the tube 50 is similar to that described above with reference to Fig. 1 with the exception that the wire 40 defines the size of the elemental line rather than the slit 25. In this modification it may be desirable to extend the connecting layer 17 around the ends of the tube, leaving only a narrow window 44 for the entrance of the illumination of the image from the film 31. A second window 46 may be provided in the coating 17 so that such portions of the electron beam C which do not strike the member 40 will not contribute to the signal. The electrons striking the tube 50 at the window 46 will merely charge up the glass and this charge will leak away slowly and so produce no signals in the television signal band. Another alternative would be to include another electrode (not shown) in the tube to collect these electrons which electrode is connected to the main circuit through an appropriate filter. It is to be understood that the portion to the right of the line X—X in Fig. 3 is similar to the portion to the left of the line X—X in Fig. 1 and that the operation of Fig. 3 is similar to that described above with reference to Fig. 1.

A further modification is shown in Fig. 5. In this figure the insulating layer 42 and photosensitive globules 43 of the linear element 40 have been replaced by a continuous layer of photoconducting material 45 which is coated directly on the conducting wire 41. The photo-conducting material 45 should be of such high specific resistance (higher than that of selenium) and of such thinness with respect to the size of the cathode ray beam (the smaller dimension when the beam is of rectangular cross-section) that its lateral conductivity is negligible in comparison with its transverse conductivity, thus preventing diffusion of the image. Mercuric iodide is a suitable material for this purpose. The operation of this screen, which is connected into the tube in the same way as the linear screen of Fig. 4, is different from the photo-emissive screen. A moving meam of electrons generated by the electron gun sets up a charge along the surface of the photo-conducting material 45. This charge leaks through the material 45 to the conducting wire 41 at a rate depending upon the illumination of the elemental areas of the element 45, which illumination is in turn proportional to the light-tone values of the corresponding elemental areas of the object on the film 31. Upon the return of the cathode ray beam the potentials of the elemental areas are successively restored to their former values and a succession of surges is set up in the resistance 34 which are proportional to the light-tone values of the elemental areas of the image. For a more complete description of the theory of operation of a photo-conducting cathode ray transmitting device. reference should be made to Patent 2,150,160 of Frank Gray, March 14, 1939.

The linear electron beam scanning devices described above all have the advantage that only one set of deflecting plates is required with a consequent omission of one sweep circuit. Another advantage when the beam is of rectangular cross-section is that the beam control means need not be as accurate as would otherwise be necessary. A further advantage lies in the fact that the mosaic screen is only a linear strip, thus making it possible to have a more accurate control of the sensitizing process. For example, in the making of the devices shown in Figs. 4 and 5, a current may be passed through the wire 41 to perform the required baking operation.

While the above-described filamentary light sensitive targets have been mentioned above in connection with tubes used for single-line scanning, it is to be understood that the use of this structure is not so limited since a parallel assemblage of such targets could be employed, as, for example, in place of an ordinary rectangular target.

Various other modifications may obviously be made without departing from the spirit of the invention, the scope of the invention being defined by the appended claims.

What is claimed is:

1. A cathode ray device comprising means for forming a cathode ray beam having a cross-section in which a dimension thereof in one direction is larger than a dimension thereof in a direction at right angles to said first direction, photoconducting material of high specific resistance in the path of the electrons in said beam, means for confining the illumination of said material to an elongated section thereof, and means for sweeping said beam along the length of said section, the larger dimension of said beam cross-section being transverse to the sweeping direction.

2. A cathode ray device comprising an electron gun, a transparent insulating plate positioned transversely of the path of the electrons emitted by said gun, an opaque screen adjacent said plate having an elongated slot on the side thereof remote from said gun, light sensitive electric material supported by said plate on the side nearer said gun and opposite said slot, and means to sweep said beam along said material.

3. A cathode ray device comprising an electron gun, a transparent insulating plate positioned transversely of the path of the electrons emitted by said gun, an opaque screen adjacent said plate having an elongated slot on the side thereof remote from said gun, photo-emissive material supported by said plate on the side nearer said gun and opposite said slot, and means to sweep said beam along said material.

4. A cathode ray device comprising means for forming a cathode ray beam having a cross-section in which a dimension thereof in one direction is larger than a dimension thereof in a direction at right angles to said first direction, a single taut wire located transversely of the path of the electrons in said beam, light sensitive electric material supported by said wire, and means for sweeping said beam along said wire in a single continuous motion, the larger dimension of said beam cross-section being transverse to the sweeping direction.

5. A cathode ray device comprising means for forming a cathode ray beam having a cross-section in which a dimension thereof in one direction is larger than a dimension thereof in a direction at right angles to said first direction, a linear light sensitive screen located transversely of the path of the electrons in said beam, said screen comprising a taut insulated wire supporting photo-emissive material, and means to sweep said beam along said wire in a single continuous motion, the larger dimension of said beam cross-section being transverse to the sweeping direction.

6. A cathode ray device comprising an electron gun, a single taut wire located transversely of the path of electrons from said gun, a continuous coating of photo-conducting material supported by said wire, and means to sweep said beam along said wire in a single continuous motion.

7. In a cathode ray device, means for generating a moving beam of electrons of rectangular cross-section, a linear photo-sensitive target, and means for causing said beam to scan said target, the larger dimension of said rectangle being transverse to the scanning direction.

8. The combination with an element having a light sensitive surface in the form of a narrow strip, means for imaging a strip of a field to be scanned upon said surface, means for producing and directing to said surface a beam of electrons of rectangular cross-section, the dimension of the cross-sectional area perpendicular to the length of said surface being greater than the width of said surface, and means for sweeping said beam across said surface in the direction of its long dimension.

9. Electro-optical means comprising means for utilizing light from different parallel elemental strips of an object during time intervals succeeding each other without interruption and for setting up an image current representative at each instant of a light-tone value of an elemental area of said object, said means comprising a linear element of light-sensitive material exposed to said light from said elemental strips in succession, means for forming a cathode ray beam having a cross-section in which a dimension thereof in one direction is larger than a dimension thereof in a direction at right angles to said first direction, and means for causing said cathode beam to sweep the light-sensitive material of said linear element lengthwise thereof in a path wider than said linear element and to repeat said sweep over said path for each of said time intervals, the larger dimension of said beam cross-section being transverse to the sweeping direction.

10. Electro-optical means comprising means for utilizing light from different overlapping parallel elemental strips of an object during time intervals succeeding each other without interruption and for setting up an image current representative at each instant of a light-tone value of an elemental area of said object, said means comprising a linear element of light-sensitive material exposed to said light from said elemental strips in succession, means for causing a cathode beam to sweep the light-sensitive material of said exposed linear element lengthwise thereof in a path wider than said exposed linear element and to repeat said sweep over said path for each of said time intervals, an insulating layer supporting said linear element of light-sensitive material, and a conductive element adjacent said layer on the side thereof remote from said linear element, said conductive element having a light permeable longitudinal window therein opposite said linear element.

11. Electro-optical means comprising means for directing light from different overlapping elemental strips of an object during time intervals succeeding each other without interruption and for setting up an image current representative at each instant of a light-tone value of an elemental area of said object, said means comprising a substantially plane element of light sensitive material exposed to light from said elemental strips in succession, means for forming a cathode ray beam having a cross-section in which a dimension thereof in one direction is larger than a dimension thereof in a direction at right angles to said first direction, means for causing said cathode beam to sweep the light-sensitive material of said linear element lengthwise thereof in a single linear path wider than said exposed linear element and to repeat said sweep over said path for each of said time intervals, the larger dimension of said beam cross-section being transverse to the sweeping direction, a transparent insulating layer supporting said linear element of light-sensitive material, and a conductive element adjacent said layer on the side thereof remote from said linear element, said conductive element having a substantially linear light permeable window adapted to transmit light to said element of light-sensitive material through said insulating layer.

12. Electro-optical apparatus comprising a taut filamentary conductive element, light-sensitive material on said element, means for generating and directing to said element a cathode beam having a cross-section in which a dimension thereof in one direction is larger than a dimension thereof in a direction at right angles to said first direction, means for repeatedly sweeping said beam along said element so that said beam impinges upon the elemental portions of said light-sensitive material in succession during each sweep, the larger dimension of said beam cross-section being transverse to the sweeping direction, and means for sweeping an image of an object over said light-sensitive material in a direction perpendicular to the length of said element.

13. Electro-optical apparatus comprising a taut filamentary conductive element, a continuous coating of photo-conducting material on said element, means for generating and directing to said element a cathode beam, means for repeatedly sweeping said beam along said element so that said beam impinges upon the elemental portions of said photo-conducting material in succession during each sweep, and means for sweeping an image of an object over said photo-conducting coating in a direction perpendicular to the length of said element.

14. Electro-optical apparatus comprising a taut filamentary conductive element, a thin insulating layer on said element, light-sensitive material on said insulating layer, means for generating and directing to said element a cathode beam having a cross-section in which a dimension thereof in one direction is larger than a dimension thereof in a direction at right angles to said first direction, means for repeatedly sweeping said beam along said element so that said beam impinges upon the elemental portions of said light-sensitive material in succession during each sweep, the larger dimension of said beam cross-section being transverse to the sweeping direction, and means for sweeping an image of an object over said light-sensitive coating in a direction perpendicular to the length of said element.

15. Electro-optical apparatus comprising a taut filamentary conductive element, a thin insulating layer on said element, light-sensitive material on said insulating layer, means for generating and directing to said element a cathode beam the cross-sectional area of which in the region of said element has a dimension perpendicular to the length of said element which is large compared with the dimension of said element and its coatings in that direction and which area has a much smaller dimension in the direction of the length of said element, means for repeatedly sweeping said beam along said element so that said beam impinges upon the elemental portions of said light sensitive material in succession during each sweep, and means for sweeping an image of an object over the light-sensitive coating on said element in a direction perpendicular to the length of said element.

HERBERT E. IVES.